(12) United States Patent
Kim

(10) Patent No.: US 8,532,191 B2
(45) Date of Patent: Sep. 10, 2013

(54) IMAGE PHOTOGRAPHING APPARATUS AND METHOD OF CONTROLLING THE SAME

(75) Inventor: In Ho Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 483 days.

(21) Appl. No.: 12/760,697

(22) Filed: Apr. 15, 2010

(65) Prior Publication Data

US 2010/0271485 A1    Oct. 28, 2010

(30) Foreign Application Priority Data

Apr. 24, 2009  (KR) .................................. 2009-35761

(51) Int. Cl.
*H04N 7/26* (2006.01)
*H04N 7/50* (2006.01)

(52) U.S. Cl.
USPC ......... 375/240.16; 348/35; 354/126; 354/127

(58) Field of Classification Search
None
See application file for complete search history.

(56) References Cited

U.S. PATENT DOCUMENTS

| | | | |
|---|---|---|---|
| 6,323,898 B1 * | 11/2001 | Koyanagi et al. | 348/169 |
| 6,766,037 B1 * | 7/2004 | Le et al. | 382/107 |
| 6,819,778 B2 * | 11/2004 | Kamei | 382/103 |
| 6,867,799 B2 * | 3/2005 | Broemmelsiek | 348/169 |
| 6,901,110 B1 * | 5/2005 | Tsougarakis et al. | 375/240.12 |
| 6,965,902 B1 * | 11/2005 | Ghatate | 1/1 |
| 7,095,785 B2 * | 8/2006 | Youn et al. | 375/240.12 |
| 7,095,786 B1 * | 8/2006 | Schonfeld et al. | 375/240.16 |
| 7,313,278 B2 * | 12/2007 | Echigo et al. | 382/190 |
| 7,379,565 B2 * | 5/2008 | Blonde et al. | 382/107 |
| 7,650,016 B2 * | 1/2010 | Gold, Jr. | 382/107 |
| 7,773,116 B1 * | 8/2010 | Stevens | 348/208.4 |
| 7,916,172 B2 * | 3/2011 | Kagei | 348/169 |
| 8,103,134 B2 * | 1/2012 | Sorek et al. | 382/313 |
| 8,139,896 B1 * | 3/2012 | Ahiska et al. | 382/298 |
| 8,189,051 B2 * | 5/2012 | Shih et al. | 348/169 |
| 8,194,134 B2 * | 6/2012 | Furukawa | 348/169 |
| 2006/0126737 A1 * | 6/2006 | Boice et al. | 375/240.16 |
| 2007/0237514 A1 * | 10/2007 | Pillman et al. | 396/153 |
| 2009/0295926 A1 * | 12/2009 | Miyazaki | 348/169 |

FOREIGN PATENT DOCUMENTS

KR    1020000054329    9/2000

* cited by examiner

*Primary Examiner* — Gims Philippe
*Assistant Examiner* — Reza Aghevli
(74) *Attorney, Agent, or Firm* — Stanzione & Kim, LLP

(57) ABSTRACT

A method of controlling an image photographing apparatus to track a subject using a non-viewable pixel region of an image sensor includes detecting a motion vector of a subject when a moving image is photographed, determining whether a non-viewable pixel region of an image sensor is present in the direction of the detected motion vector of the subject, and moving a photographing region to the non-viewable pixel region so as to track the motion of the subject. Accordingly, the moving subject may be tracked within a range of a pre-determined Field of View (FOV) of the image photographing apparatus without an additional hardware system.

39 Claims, 13 Drawing Sheets

IMAGE PHOTOGRAPHING APPARATUS AND METHOD OF CONTROLLING THE SAME

CROSS-REFERENCE TO RELATED APPLICATIONS

This application claims the benefit of Korean Patent Application No. 2009-0035761, filed on Apr. 24, 2009 in the Korean Intellectual Property Office, the disclosure of which is incorporated herein by reference in its entirety.

BACKGROUND

1. Field of the Invention

Embodiments of the present general inventive concept relate to a method of controlling an image photographing apparatus, which tracks a subject by moving a photographing region.

2. Description of the Related Art

Generally, an image photographing apparatus detects a moving object by a method of using a differential image signal between two frames or a method of using a motion vector. The method of using the differential image signal performs subtraction of pixel values of coordinate points of a previous frame and a current frame, and uses a principle in which a pixel has a value other than "0" if slight motion occurs between the two frames. If pixels have values equal to or greater than a predetermined reference value, it is determined that the pixel values are changed due to appearance of an object or the like and the object is moved. In the method of using the differential image signal, an operation method is simple and motion is rapidly detected.

In contrast, in the method of detecting the moving object using the motion vector, the motion vector between a current frame and a previous frame is detected by a full search method or the like, and it is determined that the object is moved if the motion vector is equal to or greater than a predetermined reference value. The method of detecting the motion of the object using the motion vector is less sensitive to illumination change or noise than the method of using the differential image signal, and the motion direction of the moved object is recognized.

In order to detect the moving object, track the motion of the detected object, and perform photographing using the above-described methods, the image photographing apparatus performs photographing while moving.

SUMMARY

Therefore, it is an aspect of the present general inventive concept to provide a method of controlling an image photographing apparatus, which tracks motion of a subject using a non-viewable pixel region of an image sensor of the image photographing apparatus.

Additional aspects of the present general inventive concept will be set forth in part in the description which follows and, in part, will be obvious from the description, or may be learned by practice of the general inventive concept.

Features and/or utilities of the present general inventive concept may be realized by a method of controlling an image photographing apparatus includes detecting a motion vector of a subject when a moving image is photographed, determining whether a non-viewable pixel region of an image sensor is present in the direction of the motion vector, and moving a photographing region to the non-viewable pixel region.

The photographing of the moving image may include photographing the moving image using a partial pixel region of an entire pixel region of the image sensor.

The size of the partial pixel region may be manually or automatically set.

The subject may be one or more objects, which are manually or automatically set, of objects present in the moving image.

The detecting of the motion vector of the subject may include detecting the motion vectors of one or more objects and obtaining an average of the motion vectors.

The detecting of the motion vector of the subject may include comparing a previous frame and a current frame of the moving image and detecting the motion vector.

The determining of whether the non-viewable pixel region of the image sensor is present in the direction of the motion vector may include determining whether a pixel region, which is not used to photograph the moving image, in an entire image region of the image sensor is present in the direction of the motion vector.

The moving of the photographing region to the non-viewable pixel region may include moving the photographing region according to the size or the direction of the motion vector of the subject.

The moving of the photographing region to the non-viewable pixel region may include adjusting a motion speed of the photographing region according to the size of the motion vector of the subject and moving the photographing region.

The moving of the photographing region to the non-viewable pixel region may include moving the photographing region in the direction of the motion vector of the subject.

The moving of the photographing region to the non-viewable pixel region may include setting the non-viewable pixel region as the photographing region.

The photographing region may be set such that the moving subject is included in the photographing region.

The photographing region may be set such that the subject is located at a central portion of the photographing region.

If it is determined that the non-viewable pixel region of the image sensor is not present in the direction of the motion vector, information indicating that the non-viewable pixel region is not present may be displayed on a screen or output by an audio signal.

Features and/or utilities of the present general inventive concept may also be realized by a method of controlling an image photographing apparatus includes determining whether a subject tracking mode is entered when a moving image is photographed and setting a photographing region of the moving image using a non-viewable pixel region of the image sensor if it is determined that the subject tracking mode is entered.

The subject tracking mode may be automatically or manually set.

A motion vector of the subject may be detected if it is determined that the subject tracking mode is entered.

The detecting of the motion vector of the subject may include detecting motion vectors of one or more objects of objects present in the moving image and obtaining an average thereof.

The detecting of the motion vector of the subject may include comparing a previous frame and a current frame of the moving image and detecting the motion vector.

When the motion vector is detected, it may be determined whether the non-viewable pixel region of the image sensor is present in the direction of the motion vector.

The determining of whether the non-viewable pixel region of the image sensor is present in the direction of the motion vector may include determining whether a pixel region, which is not used to photograph the moving image, in an entire image region of the image sensor is present in the direction of the motion vector.

The setting of the photographing region of the moving image using the non-viewable pixel region of the image sensor may include moving the photographing region according to the size and the direction of the motion vector of the subject.

The setting of the photographing region of the moving image using the non-viewable pixel region of the image sensor may include adjusting a motion speed of the photographing region according to the size of the motion vector of the subject and moving the photographing region.

The setting of the photographing region of the moving image using the non-viewable pixel region of the image sensor may include moving the photographing region in the direction of the motion vector of the subject.

The photographing region may be set such that the moving subject is included in the photographing region.

The photographing region may be set such that the subject is located at a central portion of the photographing region.

According to an embodiment of the present general inventive concept, the moving subject may be tracked using the non-viewable pixel region of the image sensor when the moving image is photographed.

Features and/or utilities of the present general inventive concept may also be realized by a method of tracking an object in a video image, the method including determining a vector of an object in an image and adjusting a location of a utilized portion of an image sensor to correspond to the vector of the object.

The utilized portion of the image sensor corresponds to a number of pixels less than a total number of pixels of the image sensor to generate an image having a smaller pixel area than an image generated by the total number of pixels.

Adjusting the utilized portion of the image sensor may include moving the utilized portion from a first position corresponding to a first image frame to a second position to correspond to the vector of the object in a second, subsequent image frame.

Moving the utilized portion to the second position may include moving the utilized portion into a portion of the image sensor having unused pixels when capturing the first image frame.

Features and/or utilities of the present general inventive concept may also be realized by a method of tracking an object in a video, the method including capturing an entire image with an image-capture device, calculating a vector of an object in the image, and cropping the entire image to generate a cropped portion to correspond to the vector of the object.

Calculating the vector of the object may include comparing a characteristic of the object in a first frame of the video with the characteristic of the object in a subsequent frame of the video.

Cropping the image may include moving a location of the cropped portion of the image between a first frame and a subsequent frame to correspond to the calculated vector.

Moving the location of the cropped portion may include positioning the cropped portion of the second frame to correspond to a portion of the first frame that is outside the cropped portion.

The method may further include displaying the cropped portion, displaying a symbol corresponding to the vector of the object, or displaying an alert when a portion of the tracked object is outside the entire image.

Features and/or utilities of the present general inventive concept may also be realized by a computer-readable medium having executable code stored thereon to cause an imaging device to perform a method, the method including determining a vector of an object and adjusting a location of a utilized portion of an image sensor to correspond to the vector of the object.

Features and/or utilities of the present general inventive concept may also be realized by a computer-readable medium having executable code stored thereon to cause an imaging device to perform a method, the method including capturing an entire image with an image-capture device, calculating a vector of an object in the image, and cropping the entire image to generate a cropped portion to correspond to the vector of the object.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE EMBODIMENTS

Figure 1A:
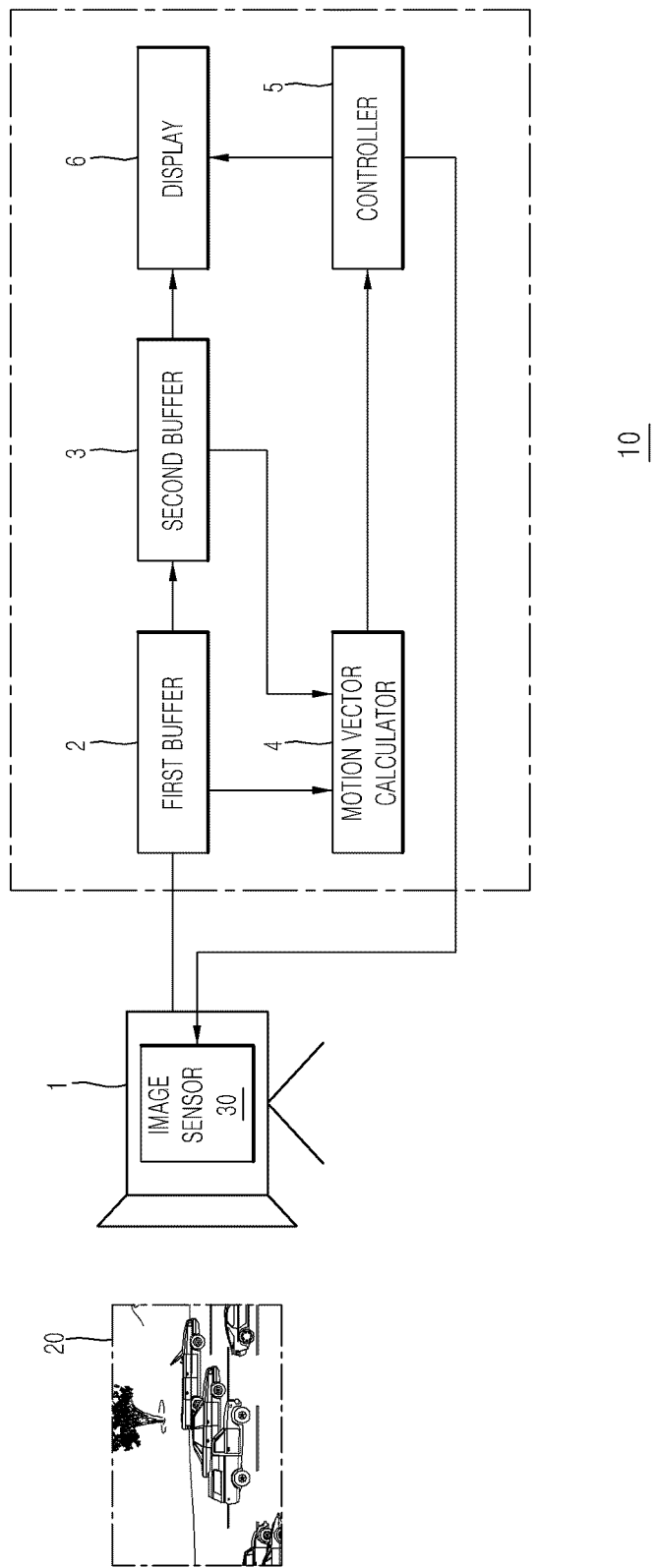
FIG. 1A is a block diagram of an image photographing apparatus according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram of an image photographing apparatus according to an embodiment of the present general inventive concept.

Figure 1B:
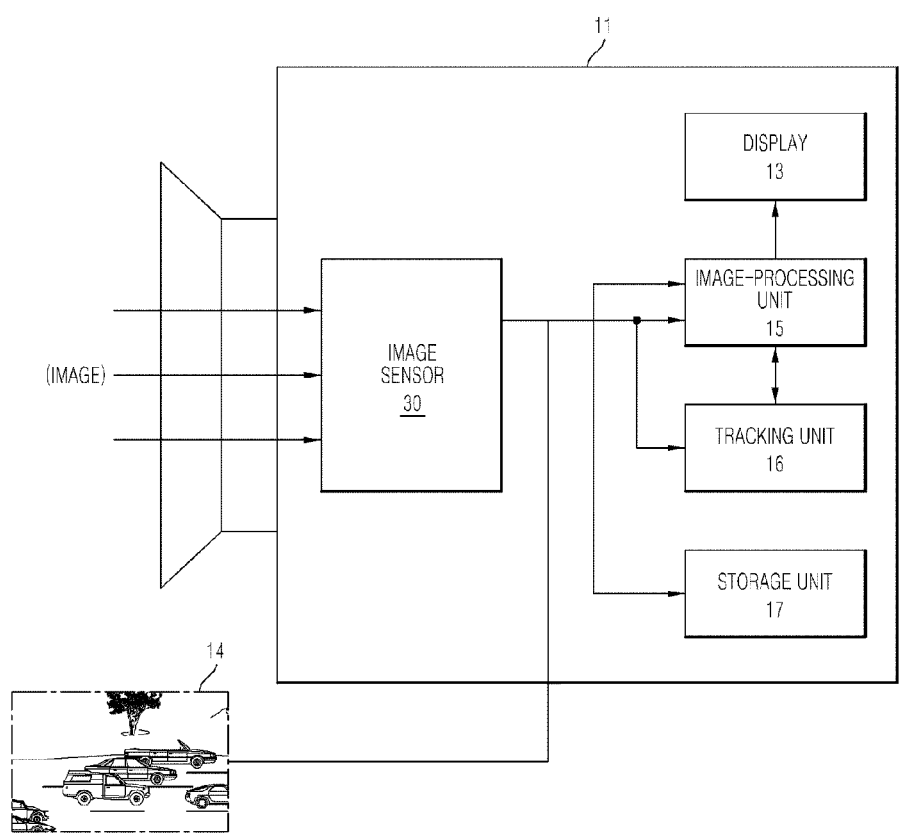
FIG. 1B is a block diagram of an image photographing apparatus according to another embodiment of the present general inventive concept.
Figure 2A:
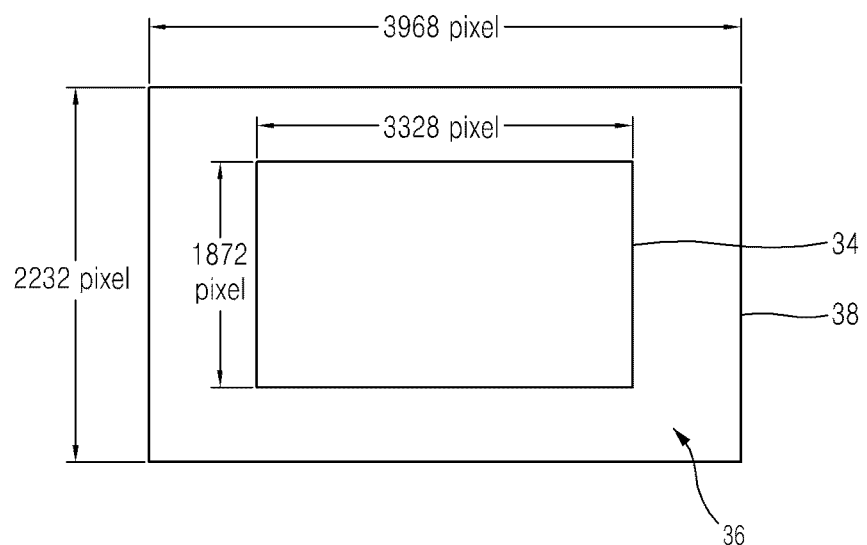
FIGS. 2A to 2C are conceptual diagrams schematically showing the size of an image sensor of the image photographing apparatus according to an embodiment of the present general inventive concept.
Figure 2B:
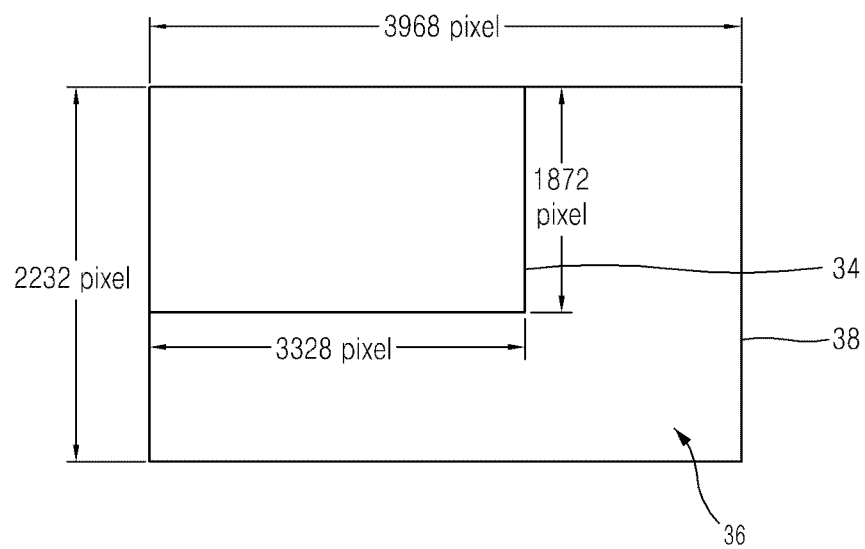
Figure 2C:
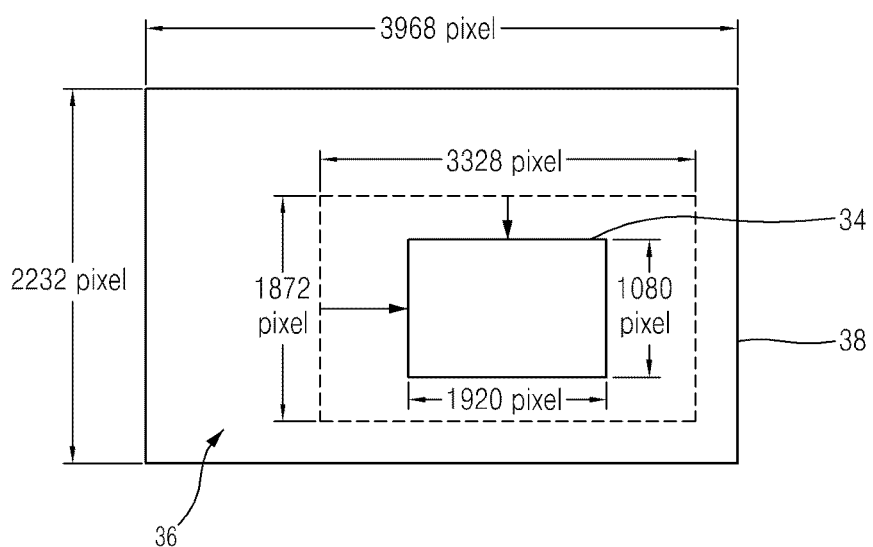

As shown in FIG. 1, the image photographing apparatus 10 includes a first buffer 2 to receive and store frame data of an image screen 20 photographed by a camera 1 including an image sensor 30 (as shown in FIGS. 2A-2C), a second buffer 3 to receive and store previous frame data stored in the first buffer 2, a motion vector calculator 4 to calculate a motion vector of a subject included in the frame data of the image screen 20 stored in the first buffer 2 and the second buffer 3, a controller 5 to track the subject based on the motion vector of the subject calculated by the motion vector calculator 4, and a display 6 to display a screen photographed by the camera 1.

The first and second buffers 2, 3 may include memory, such as RAM, to store data. The buffers 2, 3 may also include controlling logic to control data to be read from or written to the memory. The controller 5 may include at least one processor, supporting logic, and memory, such as cache memory. The motion vector calculator 4 may include logic circuits and memory, and may also include a processor. The display 6 may include an LCD screen, a touch screen, LED's, or other displays. The camera 1 may include at least one lens and the image sensor 30, which may be an image-capture unit, such as a light-receptive semiconductor device, to convert the light to a digital signal, and supporting logic and circuitry to output a processed digital signal.

FIG. 1B illustrates an example of a camera 11 having a tracking unit 16. The camera 11 may include an image sensor 30 to capture an image and to output the captured image 14, corresponding to the image screen 20 of FIG. 1A, to the tracking unit 16. The tracking unit 16 corresponds to the photographing apparatus 10 of FIG. 1A and is located within the camera 11. In other words, the tracking unit 16 includes at least first and second buffers 2, 3 and the motion vector calculator 4 of FIG. 1A. The tracking unit 16 may also include a separate controller 5 and display 6. Alternatively, the tracking unit 16 may utilize a general camera display 13 to display tracking information and a general image-processing unit 15 or other controller within the camera 11 to control access to and operation of the buffers 2, 3 and the motion vector calculator 4.

The camera also includes the image-processing unit 15 to process data from the image sensor 30 and to output the data to the display 13 and/or to store the data in a storage unit 17. The image-processing unit 15 may also transmit image and tracking data to and from the tracking unit 16.

The image-processing unit 15 may include at least one processor and supporting circuitry and memory, such as cache memory. Supporting circuitry may include, for example, digital signal processors and logic circuitry including multiplexers, arithmetic logic units, complex programmable logic devices, and field programmable gate arrays. The storage unit 17 may include memory, such as RAM, hard disks, DVD's, CD's, or other digital data storage devices.

Referring again to FIG. 1A, the image sensor 30 receives an image and generates an image screen 20 or data corresponding to the image screen 20. When the image screen 20 is received from the camera 1, the first buffer 2 transmits previously-stored frame data to the second buffer 3 and stores newly-received frame data of the image screen.

When the frame data of the image screen is received from the first buffer 2, the second buffer 3 deletes the previously-stored frame data and stores the frame data of the newly received image data.

When the frame data is stored in the first buffer 2 and the second buffer 3, the motion vector calculator 4 calculates vector motion of object regions present in the frame data stored in the first buffer 2 and the second buffer 3 and transmits the calculated vector motion to the controller 5. A method of calculating a motion vector of a subject (object) is described in detail in Korean Registration Patent No. 0331050, for example. However, any appropriate method may be used to calculate the motion vector. For example, an approximate center of a subject (object), or a center of gravity of the subject (object), may be calculated based on the shape and orientation of the subject (object), and compared between two adjacent frames to determine the vector of the subject (object).

The controller 5 checks a photographing mode when the operation of the image photographing apparatus is started, and sets a partial pixel region 34 of an entire pixel region 38 of the image sensor 30 shown in FIG. 2A as a photographing region if the checked photographing mode is a moving image mode. The photographing region of the image sensor 30 may be manually set by a user. Specifically, when a moving image or video is photographed or captured, the user may specify the size of the photographing region of the image sensor 30. If the user presses a button of the image photographing apparatus 10 or touches the display 6 to specify any point, the photographing region may be set based on the specified point. If the user does not set the photographing region of the image sensor 30, the photographing region having a basic size (e.g., 2M) may be set in a central portion of the image sensor 30.

When the motion vector calculator 4 transmits the motion vector of the subject, the controller 5 checks a non-viewable pixel region 36 of the image sensor 30 according to the size and the direction of the transmitted motion vector. The non-viewable pixel region 36 is defined as the portion of the entire pixel region of the image sensor 30 that is not included in the partial pixel region 34. The partial pixel region 34 of the image sensor 30 used when the moving image is photographed has a coordinate value on the entire pixel region 38, and the size and the absolute location of the partial pixel region 34 in the entire pixel region 38 are obtained from the coordinate value.

In addition, if it is determined that the non-viewable pixel region 36 of the image sensor 30 is present in the direction of the motion vector of the subject, the controller 5 moves the photographing region to the non-viewable pixel region 36 and tracks the subject. That is, the (subject) may be tracked by moving the photographing region into a portion of the entire image region 38 that was in the non-viewable pixel region 36 of a previous frame.

Accordingly, the controller 5 checks the motion direction and the motion speed of the subject according to the motion information of the subject transmitted from the motion vector calculator 4, determines whether or not the non-viewable pixel region 36 of the image sensor 30 is present in the motion direction of the subject, moves the photographing region to the non-viewable pixel region 36 if it is determined that the non-viewable pixel region 36 is present, and tracks the subject. At this time, the controller 5 adjusts the motion speed of the photographing region according to the size of the motion vector of the subject and moves the subject in the direction of the motion vector.

In contrast, if it is determined that the subject is outside both the partial pixel region 34 and the non-viewable pixel region 36, an alarm may be displayed on the display 6 of the image photographing apparatus 10. For example, if the subject being tracked is on a far right side of the entire pixel region 38, and no non-viewable pixel region 36 exists between a right edge of the partial pixel region 34 and the right edge of the entire pixel region 38, the image photographing apparatus may output an alert to the display 6 indicating that the subject may not be tracked.

The controller 5 may determine a distance between the object and a boundary between the partial pixel region 34 and the non-viewable area 36 in the direction of the motion vector of the subject. The controller may determine whether or not to move at least a portion of the photographing region according to the determined distance The high-pixel image sensor 30 may be mounted within the image photographing apparatus 10 such that both a moving image and a still image may be photographed. When the still image is photographed, a high-pixel region of the image sensor 30 is used, but, when a moving or video image is photographed, a pixel region of the image sensor 30 having a smaller number of pixels than the number of pixels used to photograph the still image is used. Specifically, a still image may utilize the entire pixel region 38, while a moving image or a video image may utilize only the partial pixel region 34. Accordingly, when a moving image or video is captured by the image photographing apparatus 10, the image sensor 30 is adjusted to include a non-viewable pixel region 36 and the subject may be tracked using the non-viewable pixel region 36.

The display 6 displays a screen photographed by the camera 1 and may use a touch screen to sense the touch of the user. When a still image is being photographed, the screen may display the an image corresponding to the entire pixel region 38 with a wide Field of View (FOV). When a moving image or video is being captured, the screen may display an image corresponding to the partial pixel region 34 and thus a screen with a relatively narrow FOV is displayed. The display 6 may also display the motion direction of the subject present on the screen obtained by photographing the moving image using a symbol such as an arrow, and may discriminately display a specific subject present on the screen.

FIGS. 2A to 2C are conceptual diagrams schematically showing the relationship between the partial pixel region 34 and the entire pixel region 38 of the image sensor 30 of the image photographing apparatus according to the embodiment of the present general inventive concept.

As shown in FIGS. 2A to 2C, the image photographing apparatus 10 according to the embodiment of the present general inventive concept includes the image sensor 30 capable of capturing a high-pixel (e.g., 9M pixel) still image. When a moving image or video is photographed, only the partial pixel region (e.g., 6M pixel) 34 of the entire pixel region (e.g., 9M pixel) 38 of the image sensor 30 is used. When the moving image is photographed by the image photographing apparatus 10, the partial pixel region 34 located at any location of the image sensor 30 may be specified and the image may be photographed. That is, as shown in FIG. 2A, when the moving image is photographed, the central portion of the image sensor 30 may be specified and used as the partial pixel region 34. As shown in FIG. 2B, the image photographing apparatus 10 may specify any region of the entire pixel region 38 of the image sensor 30 as the partial pixel region 34 and photograph the moving image. As shown in FIG. 2C, the size of the partial pixel region 34 used when the moving image is photographed by the image photographing apparatus 10 may be adjusted. For example, a 6M (3328*1872) pixel region used when the moving image is photographed may be adjusted to a 2M (1920*1080) pixel region.

The partial pixel region 34 of the image sensor 30 used when the moving image is photographed may be automatically or manually set. That is, the user may operate a button (not shown) included in the image photographing apparatus 10 so as to adjust the size of the partial pixel region 34 used when the moving image is photographed, and may touch the display 6 of the image photographing apparatus 10 or operate the button included in the image photographing apparatus 10 so as to set the location (e.g., a central point) of the partial pixel region 34 used when the moving image is photographed. At this time, if the size and the location of the partial pixel region 34 of the image sensor 30 are not set by the user, the partial pixel region 34 may be located at the central point of the image sensor 30 having the basic size (e.g., 2M) set when the image photographing apparatus 10 is designed.

FIGS. 3A to 3D are views showing the photographing region of the image sensor of the image photographing apparatus according to the embodiment of the present general inventive concept.

Figure 3A:
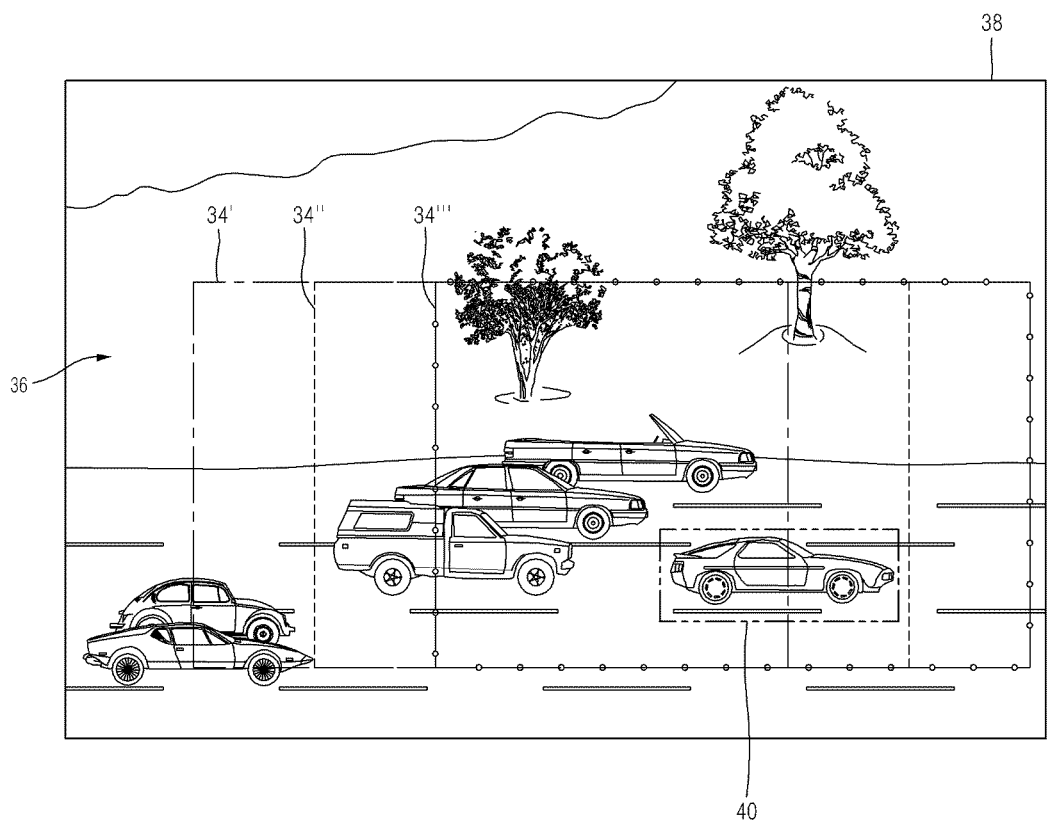
FIGS. 3A to 3D are views showing photographing regions of the image sensor of the image photographing apparatus according to an embodiment of the present general inventive concept.
Figure 3B:
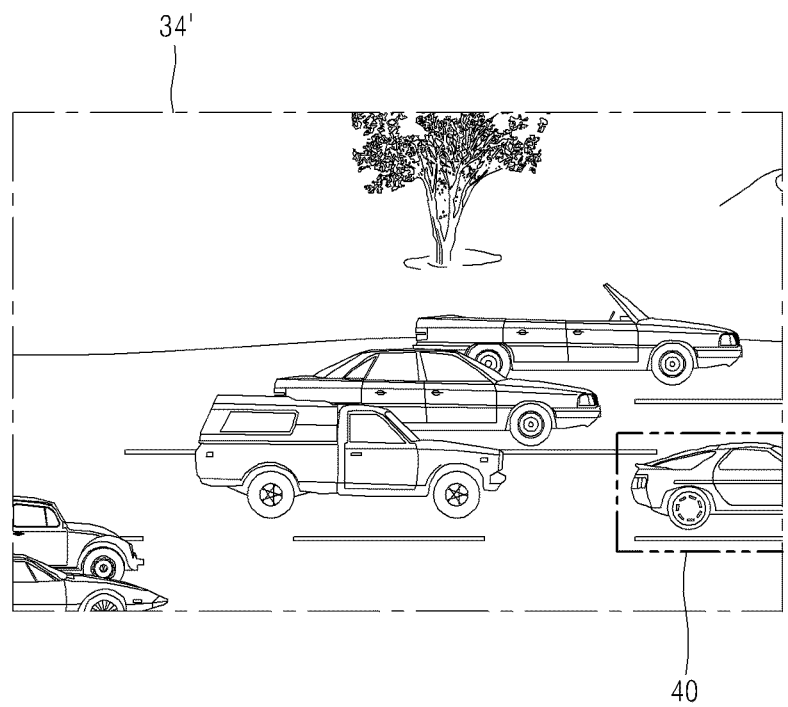
Figure 3C:
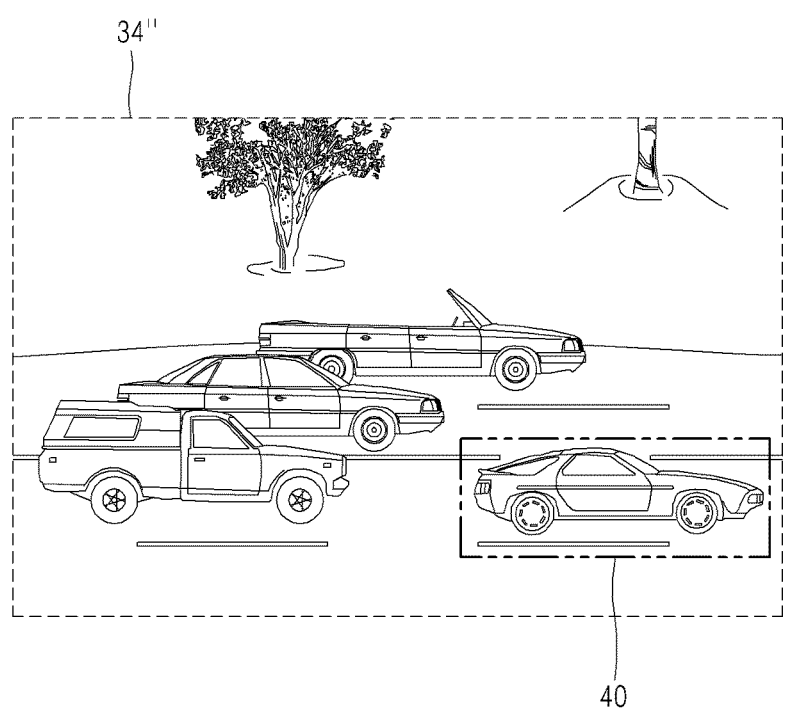
Figure 3D:
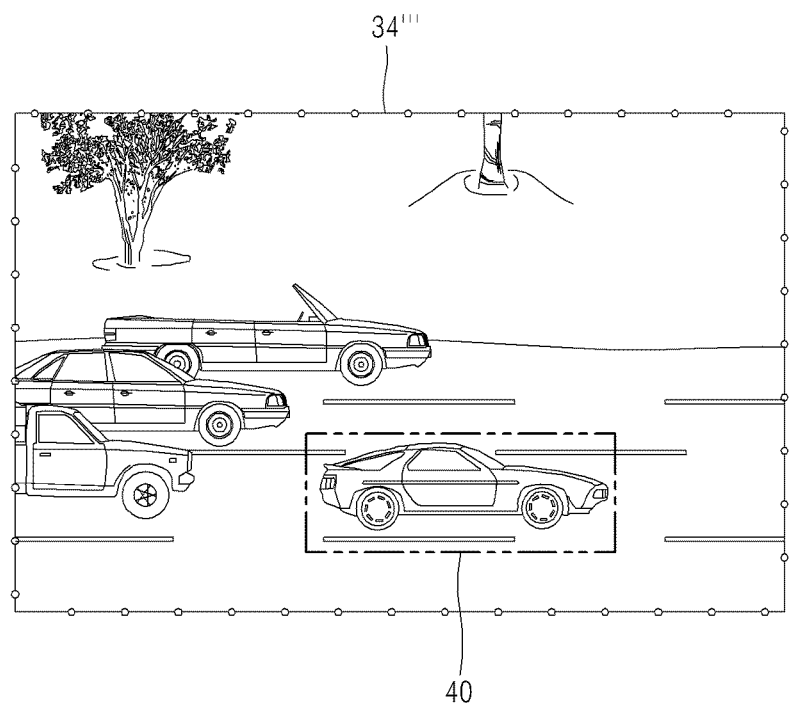

FIG. 3A shows an image signal input to the entire pixel region 38 of the image sensor 30 included in the image photographing apparatus 10. FIGS. 3B to 3D show image signals input to the partial pixel regions 34', 34" and 34'" necessary to capture the moving image of the entire pixel region 38 of the image sensor 30.

As shown in FIG. 3A, the partial pixel regions 34', 34" and 34'" of the image sensor 30 to receive a moving image signal are partial regions of the overall pixel region 38 of the image sensor 30.

When the moving image or video is photographed, at least one object of objects present in the moving image may be set as the subject 40. The image photographing apparatus 10 moves the photographing region using the non-viewable pixel region such that the set subject 40 is tracked. That is, when the user operates a directional key (not shown) included in the image photographing apparatus 10 or touches the display 6 so as to set the subject 40, the motion vector calculator 4 calculates the motion vector of the subject 40 and transmits the motion vector to the controller 5. The controller 5 moves the photographing region according to the size and the direction of the received motion vector. At this time, if the size of the motion vector of the subject 40 is large, the motion speed of the photographing region is high and, if the size of the motion vector is small, the motion speed of the photographing region is low. The controller 5 moves the photographing region such that the subject 40 is included in the central portion of the photographing region, and moves the photographing region such that the subject 40 is located at the central portion of the photographing region.

If the user sets a plurality of subjects 40 when the moving image is photographed, the motion vectors of the plurality of subjects are detected, the detected motion vectors are averaged, and a motion vector average value is used as subject tracking data. In addition, if the user does not set the subject 40 when the moving image is photographed, an average value of the motion vector of the overall photographing region is used as the subject data.

As shown in FIGS. 3B to 3D, the subject 40 may be tracked by sequentially moving the photographing region to the partial pixel regions 34" and 34'" respectively shown in FIGS. 3C and 3D according to the motion of the subject 40 in the partial pixel region 34' of the image sensor 30. According to the above-described method, the subject 40 may be tracked using the non-viewable pixel region of the image sensor 30 without operating hardware of the image photographing apparatus 10.

Figure 4:
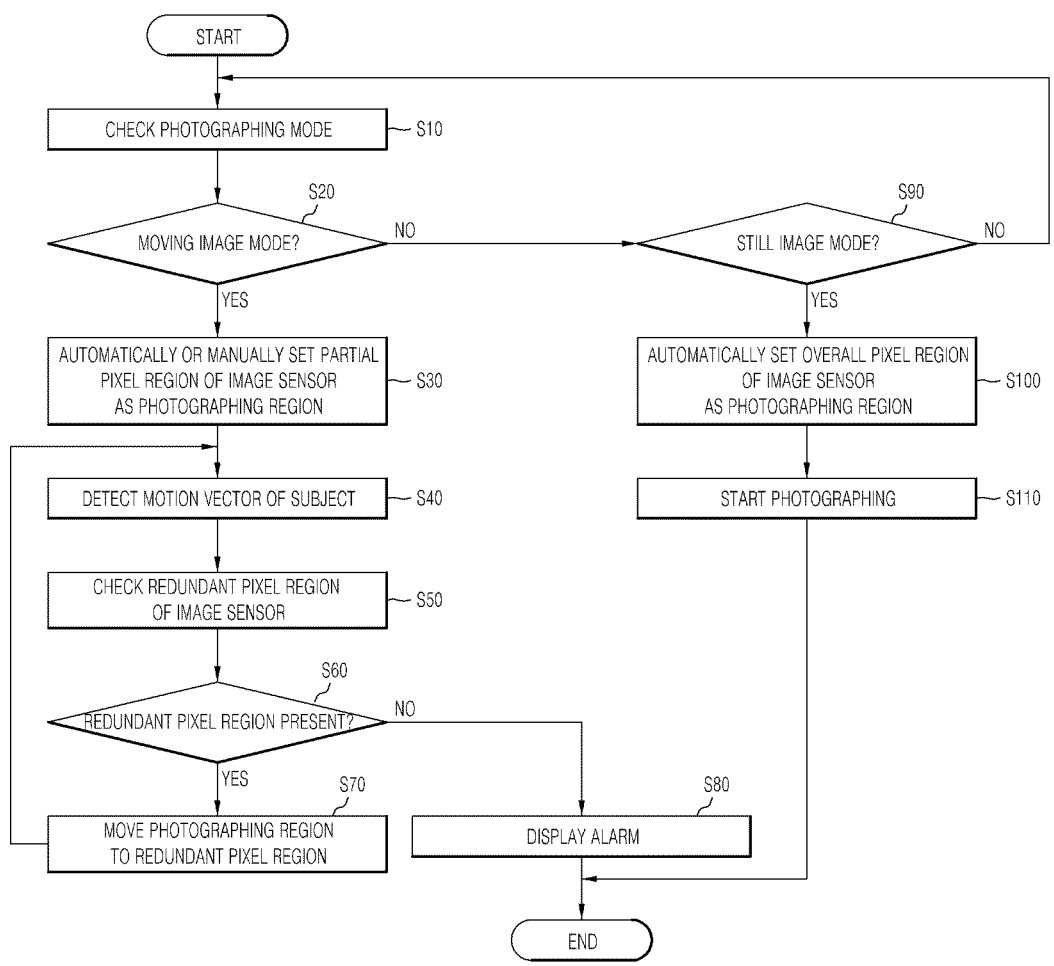
FIG. 4 is a flowchart illustrating a method of controlling an image photographing apparatus according to an embodiment of the present general inventive concept.

FIG. 4 is a flowchart illustrating a method of controlling an image photographing apparatus according to an embodiment of the present general inventive concept.

As shown in FIG. 4, the controller 5 checks the photographing mode when the operation of the image photographing apparatus 10 is started (S10).

Next, if the photographing mode of the image photographing apparatus 10 is a moving image mode, the photographing region of the image photographing apparatus 10 is automatically or manually set to the partial pixel region 34 of the entire pixel region 38 of the image sensor 30. The image photographing apparatus 10 according to the embodiment of the present general inventive concept may photograph both a moving image and a still image. The image photographing apparatus 10 which may photograph both the moving image and the still image uses the high-pixel region of the image sensor 30 when the still image is photographed and uses the low-pixel region of the image sensor 30 when the moving image is photographed. For example, when the still image is photographed, the 9M pixel (3456*2592) region of the image sensor 30 is used and, if the moving image is photographed, the 2M pixel (1920*1080) region of the image sensor 30 is used. Accordingly, if the photographing mode of the image photographing apparatus 10 is the moving image mode, the user manually sets the partial pixel region 34 of the image sensor 30 to be used in the moving image in the entire pixel region 38 of the image sensor 30 or sets the partial pixel region 34 having any size, which is basically set when a product is designed, as the photographing region (S20 and S30).

Next, if the partial pixel region 34 of the image sensor 30 is set as the photographing region by the above-described process, the motion vector of the subject is detected. The subject indicates at least one object, which is automatically or manually set, of the objects present in the moving image. Accordingly, the user may select the subject by touching at least one object displayed on the display 6 of the image photographing apparatus 10 or clicking the button (e.g., the directional key) included in the image photographing apparatus 10. The method of setting the subject is limited to the above-described method and the subject may be automatically set using a method such as a face recognition method or the like. If the subject is set by the above-described method, the motion vector of the subject is detected and the motion vector of the subject is detected by comparing a previous frame and a current frame of the moving image. At this time, if a plurality of subjects is set, the motion vectors of the subjects are detected, and the average value of the sizes and the directions of the motion vectors is obtained and is used as the subject tracking data. In addition, if the moving image is photographed but the subject is not set, the motion of the overall moving image is averaged and the motion vector is detected (S40).

Next, after the motion vector of the subject is detected, it is determined whether or not the non-viewable pixel region of the image sensor 30 is present in the direction of the detected motion vector. The non-viewable pixel region indicates the remaining pixel region except for the partial pixel region 34 used when the moving image is photographed. The partial pixel region 34 of the image sensor 30 used when the moving image is photographed has a coordinate value on the entire pixel region 38, and the size and the absolute location of the partial pixel region 34 in the entire pixel region 38 may be checked based on the coordinate value. In addition, a left uppermost point of the partial pixel region 34 is set as an offset point, and the absolute location of the partial pixel region 34 in the entire pixel region 38 of the image sensor 30 may be checked based on the set offset point (S50).

Next, if it is determined that the non-viewable pixel region of the image sensor 30 is present in the direction of the motion vector of the subject, the photographing region is moved to the non-viewable pixel region so as to track the subject. That is, the object is tracked by moving the photographing region to the remaining pixel region, which is not used to photograph the moving image, in the entire pixel region 38 of the image sensor 30 (S60 and S70).

The controller 5 moves the photographing region such that the subject is included in the photographing region, that is, moves the photographing region such that the subject is located at the central portion of the photographing region. Then, the photographing region is moved to the non-viewable pixel region of the image sensor 30 according to the size or the direction of the motion vector of the subject. That is, the motion speed of the photographing region is adjusted according to the size of the motion vector of the subject, and the motion direction of the photographing region is adjusted according to the direction of the motion vector.

Next, the image photographing apparatus 10 moves the photographing region by the above-described method and continuously tracks the subject. If the subject escapes the entire pixel region 38 of the image sensor 30, an alarm is displayed on the display 6 (S80).

The controller 5 sets the entire pixel region 38 of the image sensor 30 as the photographing region and starts the photographing if the photographing mode of the image photographing apparatus 10 is the still image mode (S90, S100 and S110).

Figure 5:
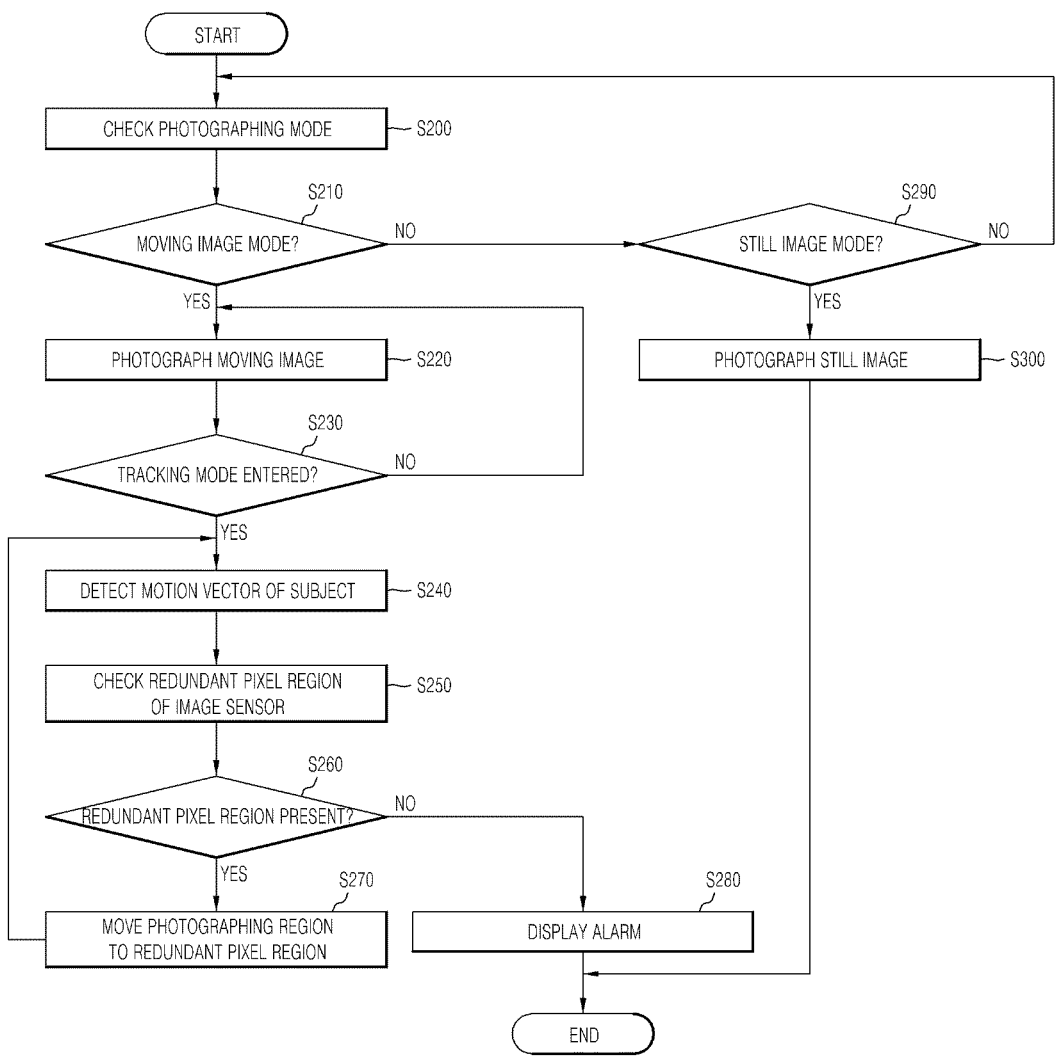
FIG. 5 is a flowchart illustrating a method of controlling an image photographing apparatus according to another embodiment of the present general inventive concept.

FIG. 5 is a flowchart illustrating a method of controlling an image photographing apparatus according to another embodiment of the present general inventive concept.

In FIG. 4, the subject tracking mode is immediately entered when the photographing of the moving image by the image photographing apparatus 10 is started. However, in FIG. 5, the subject tracking mode is entered by the manual operation of the user while the moving image is photographed by the image photographing apparatus 10.

As shown in FIG. 5, the controller 5 checks the photographing mode when the operation of the image photographing apparatus is started (S200).

Next, if it is determined that the photographing mode of the image photographing apparatus 10 is the moving image mode, the moving image is photographed and it is determined whether or not the subject tracking mode is entered while the moving image is photographed (S200, S210 and S230).

Next, it is determined that the photographing mode of the image photographing apparatus 10 enters the subject tracking mode, the motion vector of the subject is detected.

If the partial pixel region 34 of the image sensor 30 is set as the photographing region, the motion vector of the subject is detected. That is, if the subject is set by the above-described method, the motion vector of the subject is detected. The motion vector of the subject is detected by comparing the previous frame and the current frame of the moving image. At this time, if a plurality of subjects is set, the motion vectors thereof are detected, and the average value of the sizes and the directions of the motion vectors is obtained and is used as the subject tracking data. In addition, if the moving image is photographed but the subject is not set, the motion of the overall moving image is averaged and the motion vector is detected (S240).

Next, after the motion vector of the subject is detected, it is determined whether or not the non-viewable pixel region of the image sensor 30 is present in the direction of the detected motion vector.

Next, if it is determined that the non-viewable pixel region of the image sensor 30 is present in the direction of the motion vector of the subject, the photographing region is moved to the non-viewable pixel region so as to track the subject. That is, the object is tracked by moving the photographing region to the remaining pixel region, which is not used to photograph the moving image, in the entire pixel region 38 of the image sensor 30 (S260 and S270).

The controller 5 moves the photographing region to the non-viewable pixel region of the image sensor 30 according to the size or the direction of the motion vector of the subject. That is, the motion speed of the photographing region is adjusted according to the size of the motion vector of the subject, and the motion direction of the photographing region is adjusted according to the direction of the motion vector.

Next, the image photographing apparatus 10 moves the photographing region by the above-described method and continuously tracks the subject. If the subject escapes the entire pixel region 38 of the image sensor 30, an alarm is displayed on the display 6 (S280).

If it is determined that the photographing mode of the image photographing apparatus 10 is the still image mode, the controller 5 sets the entire pixel region 38 of the image sensor 30 as the photographing region and starts photographing (S290 and S300).

Although FIGS. 1A and 1B illustrate two example configurations of a photographing apparatus 10, any configuration may be used. For example, the first buffer 2 and the second buffer 3 may be located within the motion vector calculator 4. In addition, common components such as processors and logic that are not critical to the explanation of the present general inventive concept may have been omitted for clarity.

Figure 6:
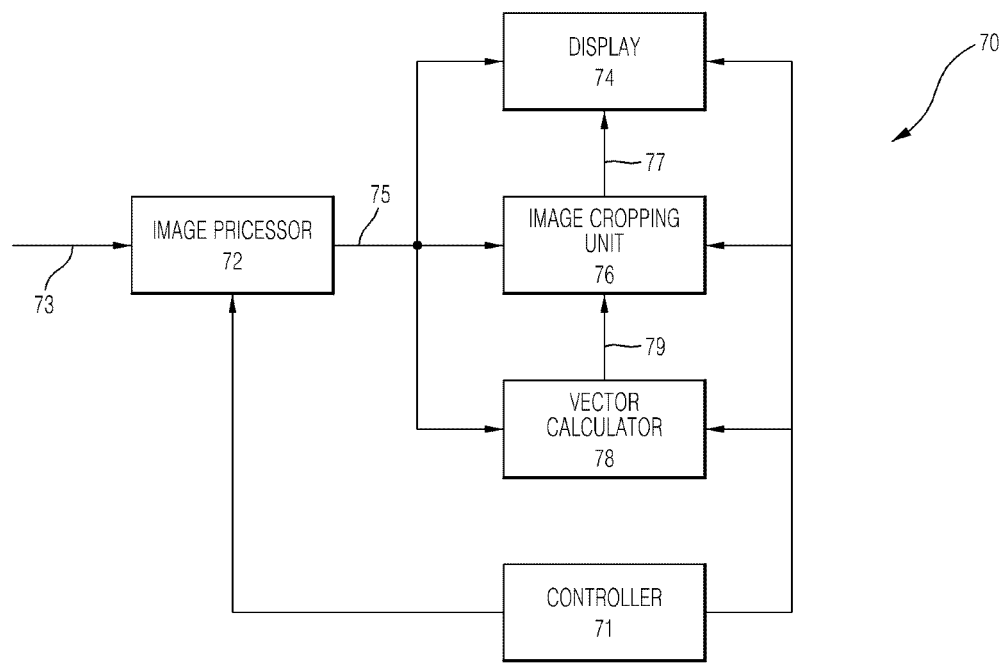
FIG. 6 is a block diagram of an image photographing apparatus according to another embodiment of the present general inventive concept.
Figure 7:
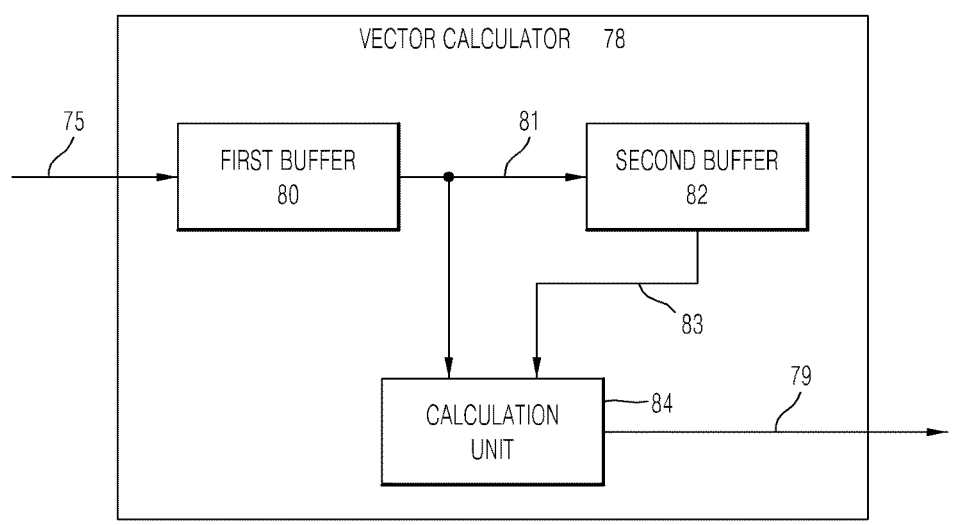
FIG. 7 illustrates a block diagram of a vector calculator according to an embodiment of the present general inventive concept.

FIGS. 6 and 7 illustrate another embodiment of a photographing apparatus 70. While the photographing apparatus 10 of FIGS. 1A and 1B adjusted a pixel area of the image sensor 30, the photographing apparatus 70 of FIG. 6 adjusts an image after it is received by the image sensor 30. In FIG. 6, an image processor 72 receives image data on a line 73 connected to an image-capture device or image sensor (not shown). The image processor 72 may process the image data to output processed image data on a line 75 connected to one or both of the display 74 and the image cropping unit 76. For example, if the photographing apparatus 70 has the capability to capture still images and motion images such as video, the image processor 72 may output an un-cropped image to the display 74 when a still image is taken.

The image processor 72 may output the image 38 to the vector calculator 78. As shown in FIG. 7, the vector calculator may include a first buffer 80, a second buffer 82, and a calculation unit 84. The first and second buffers 80, 82 correspond to the first and second buffers 2, 3 of FIG. 1A. The first buffer 80 receives new image data via the data line 75 and outputs the new image data to the calculation unit 84 via data line 81. The second buffer 82 outputs the image data of a previously-received image, corresponding to a previous frame of the video, for example, to the calculation unit 84 via data line 83. The calculation unit 84 determines a vector of a predetermined object in the image 38 and outputs the vector data to the image-cropping unit 76 via data line 79. The second buffer 82 then receives the new image data from the first buffer 80 and deletes the previous image data.

The function of the image-cropping unit 76 will be discussed with reference to FIGS. 3A-3D. Generally, when a video image is being captured, the image processor 72 may output the un-cropped image data to the image-cropping unit 76 along the data line 75. The image-cropping unit 76 may crop the unit according to predetermined dimensions that may be automatically applied or may be selected by a user. For example, a cropped portion 34 of the image 38 may be centered at a center of the image or upon an object in the image selected by a user. Alternatively, the cropped portion 34 may be centered on an object that is a prominent, in-focus object in the image 38 or that is located in the foreground of the image 38.

When the image-cropping unit 76 receives the vector data from the vector calculator 78, it determines whether the position of the cropped image 34 within the un-cropped image 38 may be adjusted to track the object in the cropped image 34. As shown in FIG. 3A, if the tracked subject 40 moves within the image 38 from one frame to the next, the image-cropping unit 76 determines whether the cropped image 34 may be moved or adjusted to include the subject 40. For example, in FIG. 3A, the cropped image 34' may be adjusted to correspond to 34" or 34'" to include the subject 40 within the cropped image or to better center the subject within the cropped image.

Settings of the photographing apparatus 70 may be adjusted manually or automatically set to limit the tracking function. For example, the tracking function may be set to always attempt to center a tracked object within the cropped image 34. Alternatively, the tracking may be set to limit movement of the cropped image 34 to a predetermined distance or a predetermined number of pixels within the entire image 38 to prevent a jumpy or choppy visual effect that may result from a subject 40 having a high velocity with respect to edges of the image 38.

Once the image-cropping unit 76 adjusts the cropped-image 34 to track an object, the image-cropping unit 76 may output the cropped image 34 to the display 74. As discussed above, if the image-cropping unit 76 is unable to track the object, it may cause an alert to be displayed on the display 74.

The functional units described in the above embodiments may comprise separate electronic circuits, or may be included within a single electronic circuit. For example, a single processor may manipulate image data process an image, crop the image, and calculate a vector. Alternatively, the processor may be connected to separate logical, memory, and processing units to perform the above functions.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A method of controlling an image photographing apparatus, the method comprising:
    determining a motion vector of a subject in a photographing region of an image sensor of the image photographing apparatus when a moving image is photographed using the image sensor;
    determining whether a non-viewable pixel region of the image sensor is present in the direction of the motion vector; and
    moving the photographing region to the non-viewable pixel region within the entire region of the image sensor.

2. The method according to claim 1, wherein the photographing of the moving image includes photographing the moving image using a partial pixel region of an entire pixel region of the image sensor.

3. The method according to claim 2, wherein the size of the partial pixel region is manually or automatically set.

4. The method according to claim 1, wherein the subject is one or more objects of objects present in the moving image, and the one or more objects are manually or automatically set as the subject.

5. The method according to claim 4, wherein the determining of the motion vector of the subject includes detecting the motion vectors of the one or more objects and obtaining an average of the motion vectors such that the photographing region is adjusted to include at least a portion of the non-viewable pixel region according to the average of the motion vector when directions of the motion vectors have predetermined angles with respect to a reference.

6. The method according to claim 1, wherein the determining of the motion vector of the subject includes comparing a previous frame and a current frame of the moving image and determining the motion vector.

7. The method according to claim 1, wherein the determining of whether the non-viewable pixel region of the image sensor is present in the direction of the motion vector includes determining whether a pixel region, which is not used to photograph the moving image, in an entire pixel region of the image sensor is present in the direction of the motion vector.

8. The method according to claim 1, wherein the moving of the photographing region to the non-viewable pixel region includes moving the photographing region within the entire region of the image sensor according to the size and the direction of the motion vector of the subject.

9. The method according to claim 1, wherein the moving of the photographing region to the non-viewable pixel region includes adjusting a motion speed of the photographing region according to the size of the motion vector of the subject and moving the photographing region within the entire region of the image sensor.

10. The method according to claim 1, wherein the moving of the photographing region to the non-viewable pixel region includes moving the photographing region within an entire region of the image sensor in the direction of the motion vector of the subject.

11. The method according to claim 1, wherein the moving of the photographing region to the non-viewable pixel region includes setting the non-viewable pixel region as the photographing region.

12. The method according to claim 1, wherein the photographing region is set such that the subject is included in the photographing region.

13. The method according to claim 11, wherein the photographing region is set such that the subject is located at a central portion of the photographing region.

14. The method according to claim 1, wherein, if it is determined that the non-viewable pixel region of the image sensor is not present in the direction of the motion vector, information indicating that the non-viewable pixel region is not present is displayed on a display.

15. A method of controlling an image photographing apparatus, the method comprising:
determining whether a subject tracking mode is entered when a moving image is photographed using an image sensor of the image photographing apparatus; and
setting a photographing region of the image sensor using a non-viewable pixel region of the image sensor if it is determined that the subject tracking mode is entered.

16. The method according to claim 15, wherein the subject tracking mode is automatically or manually set.

17. The method according to claim 15, wherein a motion vector of a subject is determined in the photographed image if it is determined that the subject tracking mode is entered.

18. The method according to claim 17, wherein the determining of the motion vector of the subject includes detecting motion vectors of one or more objects of objects present in the photographed image and obtaining an average thereof such that the photographing region is adjusted within an entire region of the image sensor to include at least a portion of the non-viewable pixel region of the image sensor according to the average of the motion vector when directions of the motion vectors have predetermined angles with respect to a reference.

19. The method according to claim 17, wherein the determining of the motion vector of the subject includes comparing a previous frame and a current frame of the moving image and detecting the motion vector.

20. The method according to claim 17, wherein, when the motion vector is determined, whether the non-viewable pixel region of the image sensor is present in the direction of the motion vector is determined.

21. The method according to claim 20, wherein the determining of whether the non-viewable pixel region of the image sensor is present in the direction of the motion vector includes determining whether a pixel region, which is not used to photograph the moving image, in an entire pixel region of the image sensor is present in the direction of the motion vector.

22. The method according to claim 20, wherein the setting of the photographing region of the moving image using the non-viewable pixel region of the image sensor includes moving the photographing region within an entire pixel region of the image sensor according to the size and direction of the motion vector of the subject.

23. The method according to claim 20, wherein the setting of the photographing region of the moving image using the non-viewable pixel region of the image sensor includes adjusting a motion speed of the photographing region according to the size of the motion vector of the subject and moving the photographing region within an entire pixel region of the image sensor.

24. The method according to claim 20, wherein the setting of the photographing region of the moving image using the non-viewable pixel region of the image sensor includes moving the photographing region within an entire pixel region of the image sensor in the direction of the motion vector of the subject.

25. The method according to claim 15, wherein the photographing region is set such that the subject is included in the photographing region.

26. The method according to claim 15, wherein the photographing region is set such that the subject is located at a central portion of the photographing region.

27. A method of tracking an object in a video image, the method comprising:
determining a motion vector of the object in the video image; and
adjusting a location of a utilized portion of an image sensor to correspond to the motion vector of the object.

28. The method according to claim 27, wherein the utilized portion of the image sensor corresponds to a number of pixels less than a total number of pixels of the image sensor to generate an image having a smaller pixel area than an image generated by the total number of pixels.

29. The method according to claim 27, wherein adjusting the utilized portion of the image sensor includes moving the utilized portion from a first position corresponding to a first image frame to a second position corresponding to a second, subsequent image frame according to the motion vector of the object.

30. The method according to claim 29, wherein moving the utilized portion to the second position includes moving the utilized portion into a portion of the image sensor having unused pixels when capturing the first image frame.

31. A method of tracking an object in a video image, the method comprising:
   capturing an entire image with an image-capture device;
   calculating a motion vector of the object in the video image; and
   cropping the entire image to generate a cropped portion to correspond to the motion vector of the object.

32. The method according to claim 31, wherein calculating the motion vector of the object includes comparing a characteristic of the object in a first frame of the video image with the characteristic of the object in a subsequent frame of the video image.

33. The method according to claim 31, wherein cropping the image includes moving a location of the cropped portion of the image between a first frame and a subsequent frame to correspond to the calculated motion vector.

34. The method according to claim 33, wherein moving the location of the cropped portion includes positioning the cropped portion of the second frame to correspond to a portion of the first frame that is outside the cropped portion.

35. The method according to claim 31, further comprising: displaying the cropped portion.

36. The method according to claim 31, further comprising: displaying a symbol corresponding to the motion vector of the object.

37. The method according to claim 31, further comprising: displaying an alert when a portion of the tracked object is outside the entire image.

38. A non-transitory computer-readable medium having executable code stored thereon to cause an imaging device to perform a method, the method comprising:
   determining a motion vector of an object in an image being photographed using an image sensor of the imaging device; and
   adjusting a location of a utilized portion of an image sensor to correspond to the motion vector of the object.

39. A non-transitory computer-readable medium having executable code stored thereon to cause an image-capture device to perform a method, the method comprising:
   capturing an entire image with an image sensor of the image-capture device;
   calculating a motion vector of an object in the entire image of the image sensor; and
   cropping the entire image to generate a cropped portion to correspond to the motion vector of the object.

* * * * *